United States Patent Office 3,577,545
Patented May 4, 1971

3,577,545
N-TETRAHALOETHYLTHIO PYRAZOLES AS BACTERICIDES AND FUNGICIDES
Joseph G. E. Fenyes, Oakland, Calif., assignor to Chevron Research Company, San Francisco, Calif.
No Drawing. Original application June 5, 1967, Ser. No. 643,415, now Patent No. 3,409,632, dated Nov. 5, 1968. Divided and this application Dec. 21, 1967, Ser. No. 703,816
Int. Cl. A01n 9/22
U.S. Cl. 424—273    8 Claims

ABSTRACT OF THE DISCLOSURE

N-(1,1,2,2-tetrahaloethylthio) pyrazoles in which the pyrazole nucleus is substituted in the 3 and 5 positions with hydrogen or lower alkyl groups and in the 4 position with hydrogen, halogen or a nitro group. Compounds of this class are fungicidal and bactericidal. They are made by reacting a pyrazole or its alkali metal salt with tetrahaloethylsulfenyl halides.

CROSS REFERENCES TO RELATED APPLICATIONS

This application is a divisional of copending application Ser. No. 643,415 filed June 5, 1967, now U.S. Pat. No. 3,409,632, which in turn is a continuation-in-part of copending application Ser. No. 573,878, filed Aug. 22, 1966 now abandoned.

FIELD OF INVENTION

This invention is directed to novel N-tetrahaloethylthio pyrazoles which are useful as pesticides. More particularly, it concerns N-(1,1,2,2 - tetrahaloethylthio)-pyrazoles and their use as bactericides and fungicides.

INVENTION DESCRIPTION

These unique compounds are N-tetrahaloethylthio pyrazoles in which the pyrazole nucleus is substituted in the 3 and 5 positions with hydrogen or alkyl groups having 1 to 4 carbon atoms and in the 4 position with hydrogen, halogen of atomic number 17 to 35, i.e., chlorine or bromine or a nitro group. These pyrazoles may be represented by the general formula

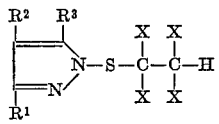

where X is halogen of atomic number 17 to 35, $R^1$ and $R^3$ are individually hydrogen or alkyl of 1 to 4 carbon atoms and $R^2$ is hydrogen, halogen of atomic number 17 to 35 or a nitro group. Preferably, $R^1$, $R^2$ and $R^3$ are hydrogen and X is chlorine. A preferred alkyl group for $R^1$ and $R^3$ is methyl.

Specific examples of these novel compounds are:

N-(1′,1′,2′,2′-tetrachloroethylthio)-pyrazole,
N-(1′,1′,2′,2′-tetrabromoethylthio)-pyrazole,
N-(2′,2′-dibromo-1′,1′-dichloroethylthio)-pyrazole,
N-(1′,1′,2′,2′-tetrachloroethylthio)-4-chloropyrazole,
N-(1′,1′,2′,2′-tetrachloroethylthio)-3-methyl-pyrazole,
N-(1′,1′,2′,2′-tetrachloroethylthio)-3,5-dimethylpyrazole,
N-(1′,1′,2′,2′-tetrachloroethylthio)-3,5-dimethyl-pyrazole,
N-(1′,2′-dibromo-1′,2′-dichloroethylthio)-4-bromopyrazole,
N-(1′,1′,2′,2′-tetrachloroethylthio)-3-propylpyrazole,
N-(1′,1′,2′,2′-tetrachloroethylthio)-5-butylpyrazole and
N-(1′,1′,2′,2′-tetrachloroethylthio)-5-methyl-4-nitropyrazole.

The N-(1,1,2,2 - tetrahaloethylthio) pyrazoles of this invention may be prepared by reacting 1,1,2,2-tetrahaloethylsulfenyl halide with pyrazole or a suitably substituted pyrazole. If desired, the alkali metal salt of the pyrazole may be used. The reaction may be carried out in water or organic solvents such as ether, hexane and benzene. If an organic solvent is used a hydrogen halide acceptor, such as a tertiary amine, must be present. The pyrazoles may be purified from the reaction mixture by conventional methods such as vacuum distillation or, where appropriate, recrystallization. In general, the pyrazole compounds of this invention are soluble in conventional organic solvents such as acetone, benzene, ether and the like.

EXAMPLES

The following examples illustrate specific methods by which compounds of this invention may be prepared. Unless otherwise indicated, percentages are by weight.

EXAMPLE 1

10.0 g. of pyrazole and 34.5 g. of 1,1,2,2-tetrachloroethylsulfenyl chloride were added to a flask containing water. The aqueous mixture was stirred fo about 19 hours at room temperature. The aqueous layer was then discarded and the organic layer was dissolved in chloroform and washed consecutively with dilute aqueous hydrochloric acid and water. The organic layer was then dried over anhydrous magnesium sulfate and filtered. The chloroform was removed from the filtrate at 60° C., 0.5 mm. Hg to give 33.9 g. N-(1,1,2,2-tetrachloroethylthio)-pyrazole.

The analysis of this compound was: Found (percent): chlorine 55.08, sulfur 12.7. Calculated (percent): chlorine 53.31, sulfur 12.06.

Other N-(1,1,2,2 - tetrahaloethylthio) pyrazoles were made using the general method illustrated by Example 1. These compounds and their analyses are reported in Table I.

TABLE I

| Compound | Analysis, percent | | | |
|---|---|---|---|---|
| | Chlorine | | Sulfur | |
| | Calc'd | Found | Calc'd | Found |
| N-(1′,1′,2′,2′-tetrachloroethylthio)-3-methylpyrazole | 50.65 | 52.64 | 11.45 | 12.27 |
| N-(1′,1′,2′,2′-tetrachloroethylthio)-3-5-dimethyl-pyrazole | 48.24 | 48.1 | 10.9 | 10.8 |
| N-(1′,1′,2′,2′-tetrachloroethylthio)-4-nitropyrazole | 45.6 | 45.5 | 10.3 | 10.0 |
| N-(1′,1′,2′,2′-tetrachloroethylthio)-3-methyl-4-nitro-pyrazole | 43.63 | 43.42 | 9.86 | 9.5 |
| N-(1′,1′,2′,2′-tetrachloroethylthio)-4-bromopyrazole | [1] 14.49 | [1] 14.49 | 9.29 | 9.12 |
| N-(1′,1′,2′,2′-tetrachloroethylthio)-3-methyl-4-bromo-pyrazole | [1] 13.92 | [1] 14.01 | 9.83 | 8.9 |
| N-(1,1,2,2-tetrachloroethylthio)-3,5-dimethyl-4-bromo-pyrazole | [1] 13.4 | [1] 12.87 | 8.69 | 8.34 |

[1] Halogen analysis in meq./g.

The pyrazoles, especially the unsubstituted and nitro-substituted compounds, of this invention have exhibited an exceptional ability for controlling bacterial plant pathogens. They are unexpectedly superior to other corresponding N-(polyhaloalkylthio)-pyrazoles, such as the N-(trihalomethylthio)-pyrazoles, as regards bactericidal activity. In tests against bacterial plant pathogens from such genera as Erwinia, Agrobacteria, Corynebacteria, Xanthomonas and Pseudomonas the compounds of this invention had $ED_{50}$'s (effective dosage for 50% inhibition) as low as 0.5 p.p.m.

This bactericidal activity is illustrated by the data in Table II. The method used to develop these data was as follows: Bacteria suspensions were prepared by washing a culture of the desired bacteria from an agar slant with sterile water into a vessel and further diluting the aqueous suspension to 250 ml. with sterile water.

The pyrazole to be tested was dissolved in acetone to 500 p.p.m. and 30λ of this solution was pipetted onto each of two surface areas on a plate covered with 20 ml. of Emerson's agar. The treated agar plates were then sprayed with the bacteria suspension and the plates were incubated for 44 to 48 hours at 24° C. The two treated areas of the plate were then observed for bacterial growth. The pyrazole's effectiveness for controlling bacterial growth in the treated areas was rated as + or —; + indicating the areas were completely free of bacterial growth and — indicating they were completely overgrown.

For comparison, N-(trichloromethylthio) pyrazole was also tested by this method.

TABLE II

| Compound | Effectiveness | |
|---|---|---|
| | E. cart-ovora | P. syrin-gae |
| N-(1,1,2,2-tetrachloroethylthio)pyrazole | + | + |
| N-(1',1',2',2'-tetrachloroethylthio)-3-methyl-4-nitropyrazole. | + | + |
| N-(1',1',2',2'-tetrachloroethylthio)-4-nitropyrazole. | + | |
| Comparison compound: N-(trichloromethylthio) pyrazola. | — | — |

The pyrazoles of this invention also exhibit excellent fungicidal activity. They are remarkably and surprisingly superior to corresponding N-(trichloromethylthio) pyrazoles. The preferred compound of this invention, N-(1,1,2,2-tetrachloroethylthio) pyrazole, is also effective in fungicidal applications in which the present commercial fungicide which contains an N-tetrachloroethylthio group is relatively ineffective. For instance, it may be applied as a vapor to stored grain, such as green corn, to control fungus diseases which attack the grain.

The fungicidal superiority of N-(1,1,2,2-tetrahaloethylthio) pyrazoles over corresponding N-(trichloromethylthio) pyrazoles was illustrated by testing N-(1,1,2,2-tetrachloroethylthio) pyrazole and N-(trichloromethylthio) pyrazole under identical conditions by the following methods.

MYCELIAL DROP METHOD

This test measures the fungitoxicity of a compound in terms of its inhibition of fungus mycelial growth. Each pyrazole was dissolved in acetone to a 125 p.p.m. concentration. Equal volumes of this solution were applied to the centers of each of three replicate paper discs inoculated with the desired fungus mycelium and placed on potato-dextrose agar medium. Following this application the discs were incubated along with inoculated but untreated control discs at ambient temperatures until the control discs were filled with mycelial growth. The fungicidal activity of the pyrazole was determined by comparing the radii of mycelial growth away from the edges of the treated and control discs. From this comparison a percent inhibition based on the relative mycelial growth areas was determined.

SLIDE SPORE GERMINATION METHOD

This method is described in the American Phytopathological Society Journal, vol. 33, pages 627–632 (1943). It measures the fungitoxicity of compounds in terms of their percent inhibition of fungus spores. The general procedure was as follows: Each pyrazole to be tested was dissolved in acetone to a concentration of 10 p.p.m. These solutions were then pipetted into the wells of depression slides and allowed to dry. The wells were filled with a spore suspension of the specified test organism and incubated in a moist chamber overnight. A group of 100 spores was examined and the number of spores germinated and not germinated was counted and recorded to show the biological activity in terms of the percentage inhibition.

The results of these comparative fungicidal tests appear in Table III.

TABLE III

| Compound | Percent inhibition | | | | |
|---|---|---|---|---|---|
| | Mycelial drop | | | Slide spore | |
| | P | H | R | M | A |
| N-(1,1,2,2-tetrachloroethylthio) pyrazole | 100 | 97 | 90 | 100 | 100 |
| N-(trichloromethylthio) pyrazole | 83 | 0 | 35 | 0 | 0 |

NOTE.—P=*Pythium ultimum;* H=*Helminthosporium sativum;* R=*Rhizoctonia solani;* M=*Monilinia fructiocla;* A=*Alternaria solani.*

Other pyrazoles of this invention were tested by the Mycelial Drop Method described above except that they were dissolved in acetone to a concentration of 500 p.p.m. The results of these tests appear in Table IV.

TABLE IV

| Compound | Percent inhibition | | | |
|---|---|---|---|---|
| | P | H | F | R |
| N-(1',1',2',2'-tetrachloroethylthio)-4-nitropyrazole | 100 | 100 | 90 | 100 |
| N-(1',1',2',2'-tetrachloroethylthio)-3-methyl-4-nitropyrazole | 100 | 100 | 98 | 100 |
| N-(1',1',2',2-tetrachloroethylthio)-4-bromopyrazole | 100 | 97 | ------ | 100 |
| N-(1',1',2',2'-tetrachloroethylthio)-3,5-dimethyl-4-bromopyrazole | 100 | 100 | 78 | 100 |
| N-(1',1',2',2'-tetrachloroethylthio)-3-methyl-4-bromopyrazole | 100 | 94 | ------ | 100 |
| N-(1',1',2',2'-tetrachloroethylthio)-3,5-dimethylpyrazole | | 100 | 94 | 100 |

NOTE.—P=*Pythium ultimum;* H=*Helminthosporium sativum;* F=*Fusarium Oxysporum;* R=*Rhizoctonia solani.*

In addition to the specific applications and formulations illustrated above, the pyrazoles of this invention may be formulated and applied in bactericidal or fungicidal amounts, as the case may be, by conventional art methods to bacteria, fungi or hosts, especially vegetative hosts such as plants, plant seeds, paper and the like, which are attacked by these pathogens. Accordingly, they may be used with inert liquid and solid carriers as powders, solutions and dispersions. Pesticidal formulations of these pyrazoles may also contain stabilizers, spreading agents, wetting agents, sticking agents, fillers, other compatible pesticides and the like.

As will be evident to those skilled in the art, various modifications on this invention can be made or followed, in the light of the foregoing disclosure and discussion, without departing from the spirit or scope of the disclosure or from the scope of the following claims.

What is claimed is:

1. A pesticidal composition for controlling bacteria or fungi comprising a bactericidally or fungicidally effective amount of a compound of the formula

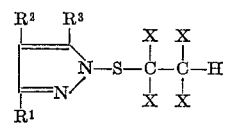

where X is halogen of atomic number 17 to 35, $R^1$ and $R^3$ are individually hydrogen or alkyl of 1 to 4 carbon atoms, and $R^2$ is hydrogen, halogen of atomic number 17 to 35 or nitro admixed with an inert liquid or solid carrier therefor.

2. A method for controlling bacteria which comprises applying a bactericidally effective amount of a compound of the formula

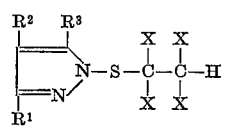

where X is halogen of atomic number 17 to 35, $R^1$ and $R^3$ are individually hydrogen or alkyl of 1 to 4 carbon atoms, and $R^2$ is hydrogen, halogen of atomic number 17 to 35 or nitro to said bacteria.

3. The method of claim 2 wherein $R^1$, $R^2$ and $R^3$ are hydrogen.

4. A method for controlling fungi which comprises applying a fungicidal amount of a compound of the formula

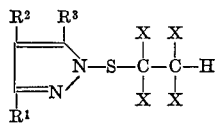

where X is halogen of atomic number 17 to 35, $R^1$ and $R^3$ are individually hydrogen or alkyl of 1 to 4 carbon atoms, and $R^2$ is hydrogen, halogen of atomic number 17 to 35 or nitro to said fungi.

5. The method of claim 4 wherein $R^1$, $R^2$ and $R^3$ are hydrogen.

6. The method of claim 4 wherein X is chlorine.

7. The composition of claim 1 wherein X is chlorine.

8. The composition of claim 7 wherein $R^1$, $R^2$ and $R^3$ are hydrogen.

References Cited
UNITED STATES PATENTS

| | | | |
|---|---|---|---|
| 2,888,462 | 12/1959 | Cannon | 260—310C |
| 3,178,447 | 4/1965 | Kohn | 424—273 |
| 3,409,632 | 11/1968 | Fenyes | 260—310C |

ALBERT T. MEYERS, Primary Examiner

V. D. TURNER, Assistant Examiner